United States Patent
Slaby et al.

(10) Patent No.: US 9,830,495 B2
(45) Date of Patent: Nov. 28, 2017

(54) BIOMETRIC AUTHENTICATION SYSTEM WITH PROXIMITY SENSOR

(71) Applicant: Motorola Mobility LLC, Chicago, IL (US)

(72) Inventors: Jiri Slaby, Buffalo Grove, IL (US); Justin Eltoft, Pleasant Prairie, WI (US); Lawrence A Willis, Dubuque, IA (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 113 days.

(21) Appl. No.: 14/802,021

(22) Filed: Jul. 17, 2015

(65) Prior Publication Data

US 2017/0017826 A1    Jan. 19, 2017

(51) Int. Cl.
| | |
|---|---|
| G06K 9/00 | (2006.01) |
| G06F 3/041 | (2006.01) |
| G06F 21/32 | (2013.01) |
| H04W 12/06 | (2009.01) |
| H04W 52/02 | (2009.01) |
| H04L 29/06 | (2006.01) |
| H04W 88/02 | (2009.01) |

(52) U.S. Cl.
CPC ......... *G06K 9/00033* (2013.01); *G06F 3/041* (2013.01); *G06F 21/32* (2013.01); *G06K 9/00013* (2013.01); *H04W 12/06* (2013.01); *H04W 52/0251* (2013.01); *G06K 9/00906* (2013.01); *H04L 63/0861* (2013.01); *H04W 88/02* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 7,599,522 | B2 * | 10/2009 | Ito | G06K 9/00 340/5.52 |
| 7,792,334 | B2 * | 9/2010 | Cohen | A61B 5/0059 382/115 |
| 8,976,136 | B2 * | 3/2015 | Annett | G06F 3/041 345/173 |
| 2005/0047632 | A1 * | 3/2005 | Miura | G06K 9/00013 382/124 |
| 2006/0008129 | A1 * | 1/2006 | Lee | G06K 9/00912 382/124 |

(Continued)

FOREIGN PATENT DOCUMENTS

WO    WO-0169520    9/2001

OTHER PUBLICATIONS

Using infrared sensors—robots, G. Benet et al. Elsevier, 0921-8890, 2002, pp. 1-12.*

(Continued)

*Primary Examiner* — Jayesh A Patel

(57) ABSTRACT

In embodiments of a biometric authentication system with proximity sensor, an electronic device includes a biometric authentication sensor and at least one activation sensor adjacent to the biometric authentication sensor. The activation sensor or sensors activate the biometric authentication sensor in response to detecting proximity of an object at a predetermined distance from the biometric authentication sensor.

21 Claims, 7 Drawing Sheets

(56) References Cited

U.S. PATENT DOCUMENTS

| | | | | |
|---|---|---|---|---|
| 2006/0151599 A1* | 7/2006 | Awatsu | ............. | G07C 9/00087 235/380 |
| 2006/0255907 A1* | 11/2006 | Min | ................... | G06K 9/00013 340/5.53 |
| 2007/0262965 A1* | 11/2007 | Hirai | ................... | B60R 11/0235 345/173 |
| 2008/0107309 A1* | 5/2008 | Cerni | ................ | G06K 9/00033 382/115 |
| 2008/0297487 A1* | 12/2008 | Hotelling | ............. | G06F 1/3203 345/173 |
| 2009/0016574 A1* | 1/2009 | Tsukahara | .............. | A61B 5/117 382/117 |
| 2011/0310005 A1* | 12/2011 | Chen | ..................... | G06F 1/3203 345/156 |
| 2011/0319128 A1* | 12/2011 | Miwa | .................. | H04M 1/6008 455/550.1 |
| 2013/0076485 A1* | 3/2013 | Mullins | ................... | G06F 21/32 340/5.83 |
| 2013/0154982 A1* | 6/2013 | Hotelling | .............. | G06F 3/0485 345/173 |
| 2013/0243264 A1* | 9/2013 | Aoki | .................. | G06K 9/00013 382/115 |
| 2013/0251215 A1* | 9/2013 | Coons | ..................... | H04N 5/33 382/118 |
| 2013/0329031 A1* | 12/2013 | Miura | ................ | G06K 9/00013 348/77 |
| 2014/0280450 A1* | 9/2014 | Luna | ..................... | H04W 4/008 709/202 |
| 2015/0057511 A1* | 2/2015 | Basu | .................. | A61B 5/02433 600/323 |
| 2015/0078635 A1* | 3/2015 | Mankowski | ....... | G06K 9/00033 382/124 |
| 2015/0161434 A1* | 6/2015 | Ross | ................. | G06K 9/00288 382/118 |
| 2016/0036996 A1* | 2/2016 | Midholt | ................ | G06F 1/3206 455/567 |

OTHER PUBLICATIONS

Using infrared sensors-robots, G. Benet et al. Elsevier, 0921-8890, 2002, pp. 1-12.*
"Extended European Search Report", EP Application No. 16179048.0, Oct. 25, 2016, 8 pages.
"Foreign Office Action", EP Application No. 16179048.0, Sep. 19, 2017, 5 pages.

* cited by examiner

BIOMETRIC AUTHENTICATION SYSTEM WITH PROXIMITY SENSOR

BACKGROUND

Portable devices, such as mobile phones, tablet devices, digital cameras, and other types of computing and electronic devices can include a biometric authentication sensor that a user can simply touch with a digit, such as a thumb or finger, to access a device. A biometric authentication sensor is typically positioned offset relative to the integrated display of an electronic device, and the display lens that covers the display extends over the sensor area offset from the display. However, the display lens is designed with an opening to accommodate access to the biometric authentication sensor so that a user can place a digit, such as a thumb or finger, on the sensor, which then images the biometric input sample for user authentication.

Also, a biometric authentication sensor needs to first be activated to image the biometric input sample, such as requiring the user to initiate a device on-button, or other type of activation of the device, which then initiates activation of the biometric authentication sensor. This type of sensor activation can include "wake on finger touch" to "wake-on" the biometric authentication sensor, which requires the sensor to always be in a powered or semi-powered state monitoring for a sensor touch. This can contribute to drain the battery or other power source of a portable device.

It is beneficial to place a biometric authentication sensor directly under a large lens or other non-conductive surfaces. Reasons for this configuration include aesthetic purposes, water resistance, smoothness, and cost. Present arrangements and technologies do not allow for low power sensor wake-on function at a sensor area under a non-conductive surface.

BRIEF DESCRIPTION OF THE DRAWINGS

Embodiments of a biometric authentication sensor under a non-conductive surface with wake-on are described with reference to the following Figures. The same numbers may be used throughout to reference like features and components that are shown in the Figures.

DETAILED DESCRIPTION

There is described an electronic device having one or more activation sensors, such as an infrared light emitting diode and a light receiving diode, or an array with a light guide system, to detect a user object in response to being in proximity to the activation sensor(s). The electronic device may also have a biometric authentication sensor to authenticate the user object in response to being in proximity of the biometric authentication sensor, in which the activation sensor or sensors may wake-on the biometric authentication sensor. The activation sensor or sensors may further confirm that the detected user object is a live body, so that the biometric authentication sensor may authenticate the user in response to determining that the user object is a genuine user object, such as a genuine finger rather than a fake finger.

Co-location of the activation sensor or sensors with the biometric authentication sensor at a determined touch area has many advantages. For example, the touch area may serve as a common place to touch and locate for user to verify their pulse. The activation sensor or sensors, such as an infrared sensor or sensors, may be used for other associated experiences. Experiences associated with the touch area include, but are not limited to, wake-on sensing, genuine finger detection, pulse measurement, proximity gesture detection, Iris illumination/detection, face illumination/detection, and the like.

An aspect of the electronic device comprises a biometric authentication sensor and at least one activation sensor adjacent to the biometric authentication sensor. The activation sensor or sensors activate the biometric authentication sensor in response to detecting proximity of an object at a predetermined distance from the biometric authentication sensor.

An aspect of the operation of the biometric authentication system is initiated by transmitting at least one light signal from the activation sensor. At least one return signal associated with the at least one light signal is detected at the activation sensor. The operation determines whether an object is within proximity of the biometric authentication sensor based on at least one return signal of the return signal or signals. The biometric authentication device is activated in response to determining that the object is detected.

While features and concepts of a biometric authentication sensor may be implemented in any number of different devices, systems, environments, and/or configurations, embodiments of a biometric authentication sensor are described in the context of the following example devices, systems, and methods.

Figure 1:
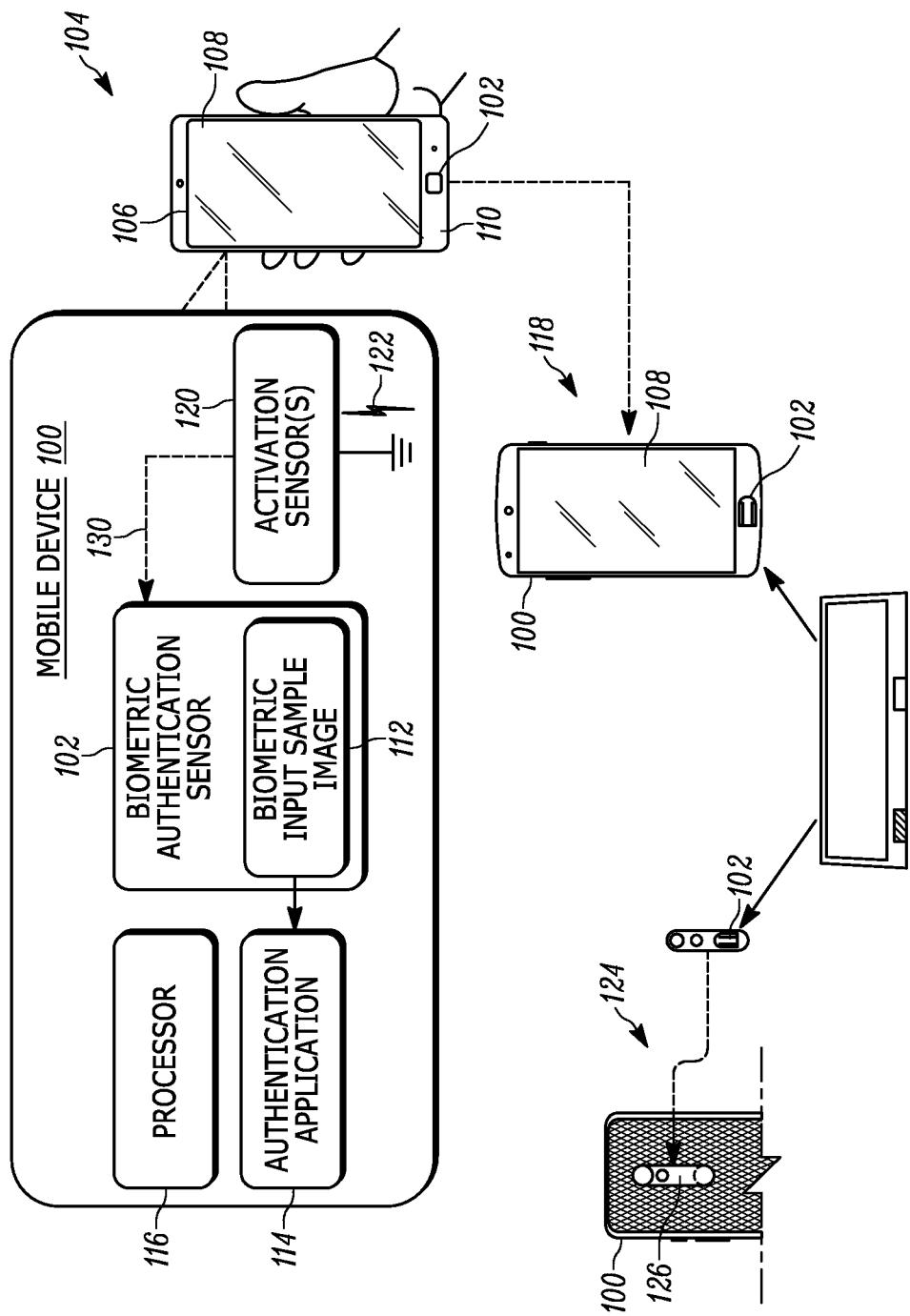
FIG. 1 illustrates an example electronic device in which embodiments of a biometric authentication sensor under a non-conductive surface with wake-on may be implemented.

Referring to FIG. 1, there is illustrated an example electronic device 100 in which embodiments of a biometric authentication sensor under a non-conductive surface with wake-on can be implemented. The example electronic device 100 may be any type of mobile phone, tablet device, digital camera, or other types of computing and electronic devices. In this example, the electronic device 100 implements components and features of a biometric authentication sensor 102 that can be utilized by a user of the electronic device for authentication to access and use the device. As shown at 104, the electronic device 100 includes an integrated display 106 and a non-conductive surface 108, such as a glass surface, over the integrated display of the electronic device. As an alternative to glass, the non-conductive surface 108 may be a ceramic, plastic, fabric, or other type of non-conductive material, particularly when placed on the back or other areas different from the display lens. In this example, the biometric authentication sensor 102 is shown positioned in a bezel area 110 around the integrated display 106 of the electronic device, and the non-conductive surface 108 that covers the integrated display 106 also extends over the bezel area 110 and over the biometric authentication sensor. The biometric authentication sensor 102 may be, for example, a fingerprint sensor, a proximity sensor, and a touch sensor.

The biometric authentication sensor 102 is shown to indicate the location of the biometric authentication sensor, which may be otherwise hidden under the non-conductive surface 108. Additionally, the housing of the electronic device 100 may include a recessed region that a user can feel to locate the position of the biometric authentication sensor 102 (e.g., a recessed region in which to place an object or digit, such as a thumb or finger, for biometric input sample authentication). For example, a user can pick up the electronic device 100 and place a thumb or finger on the non-conductive surface 108 over the location of the biometric authentication sensor 102 for authentication to use the device. The biometric authentication sensor 102 can generate a biometric input sample image 112 of a biometric input sample, and an authentication application 114 can then authenticate the user to the electronic device based on the biometric input sample image.

The authentication application 114 can be implemented as a software application or module, such as executable software instructions (e.g., computer-executable instructions) that are executable with a processor 116 of the device. Further, the authentication application 114 can be stored on computer-readable storage memory (e.g., a memory device), such as any suitable memory device or electronic data storage implemented in the electronic device. The authentication application 114 may compare biometric templates associated with potential biometric input samples, stored in computer-readable storage memory, with the biometric input samples or biometric input sample images. Additionally, the electronic device 100 can be implemented with various components, such as a processing system and memory, and any number and combination of various components as further described with reference to the example device shown in FIG. 9.

As shown in an example 118, the biometric authentication sensor 102 of the electronic device 100 can be positioned under the non-conductive surface 108 in a configuration that includes activation sensors 120, which are capable of sensing through the non-conductive surface 108 for user contact when a user of the device initiates authentication with the biometric authentication sensor. When a user of the device places an object or digit, such as a thumb or finger, over the biometric authentication sensor 102 for authentication, the user activates one or more activation sensors 120. The activation sensor or sensors 120 may be any type of sensor, positioned adjacent to the biometric authentication sensor 102, capable of activating the biometric authentication sensor in response to detecting proximity of the object at a predetermined distance from the biometric authentication sensor, such as through the non-conductive surface 108. The predetermined distance corresponds to a material layer between the object and the biometric authentication sensor. The predetermined distance corresponds to a transparent or translucent layer adjacent to the biometric authentication sensor. Upon activation of the activation sensor or sensors 102, one or more signals 130 may be provided to the biometric authentication sensor(s), and the biometric authentication sensor(s) may respond accordingly.

Additionally, the activation sensors 120 may verify that contact by an object or digit, such as a finger touch, is not fake (e.g., the "live-ness" of an authentication attempt by a live person using the biometric authentication sensor). Although the biometric authentication sensor 102 is shown merely for the illustrative example 118, in implementations, the biometric authentication sensor 102 may be concealed under the non-conductive surface 108 and/or under decorative coverings. In another example implementation shown at 124, the biometric authentication sensor 102 may be integrated under a rear bezel 126 of the device housing, along with the imager (e.g., camera device and LED for illumination).

The activation sensor or sensors 120 may determine whether the object or digit includes at least part of a circulatory system of a biological organism. The activation sensor or sensors 120 may identify fluid flowing through the object or digit. The activation sensor or sensors 120 captures multiple readings of the object or digit to identify changes in the internal portion of the object or digit.

Figure 2:
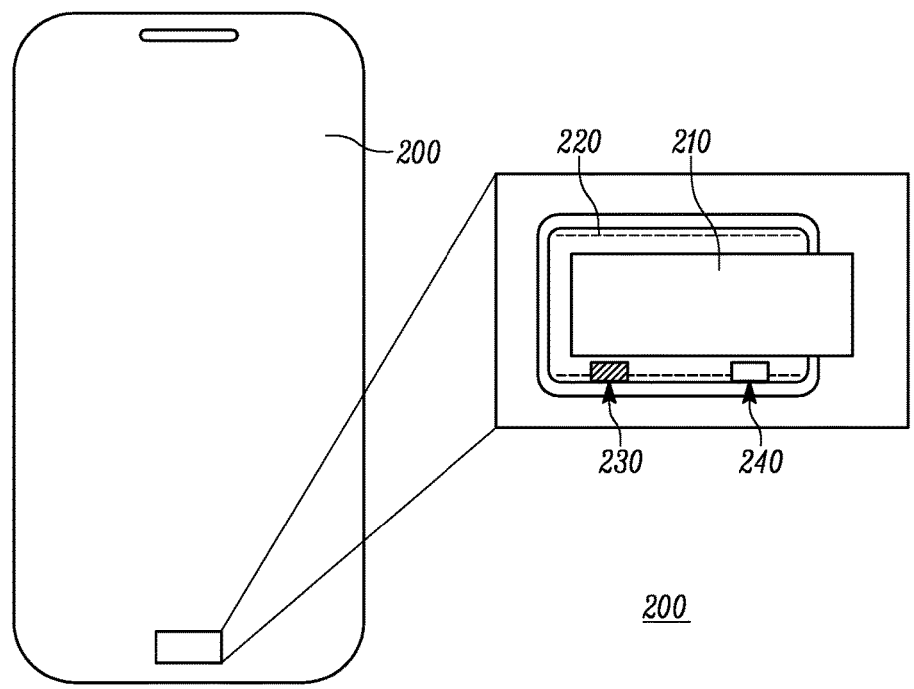
FIG. 2 illustrates an example biometric authentication sensor under a non-conductive surface with wake-on in accordance with one or more embodiments.

Referring to FIG. 2, there is shown a planar outline view of an example electronic device 200, in which most components of the device are not shown, representing the position of the biometric authentication sensor 210 as being at a lower portion of the device. The biometric authentication sensor 210 may be positioned at any location near a surface of the device 200, so long as the biometric authentication sensor is positioned under a non-conductive surface. Similarly, at least a portion of the integrated display of the electronic device 200 is positioned under the non-conductive surface. The non-conductive surface may comprise a transparent material, such as glass and/or sapphire lens. The biometric authentication sensor 210 may also be embedded under a thin section of a non-transparent material, such as ceramic, plastic, fabric, or other types of non-conductive materials that are not transparent, but thin enough to be virtually "transparent". For some embodiments, light guides may be used in order to conserve space near the biometric authentication sensor 210.

For the example shown in FIG. 2, the biometric authentication sensor 210 may be shown positioned in a bezel area around or offset from the integrated display of the electronic device 200. As stated above, the housing of the electronic device 200 may include a recessed region 220 that a user can feel to locate the position of the biometric authentication sensor 210.

The electronic device 200 also comprises one or more activation sensors 230, 240 adjacent to the biometric authentication sensor 210. The activation sensor or sensors 230, 240 activate the biometric authentication sensor 210 in response to detecting proximity of an object at a predetermined distance from the biometric authentication sensor. An example of an activation sensor or sensors 230, 240 includes at least one proximity sensor. As represented by the activation sensor of FIG. 2, the activation sensor or sensors may include multiple components, such as a light emitting diode 230 and a light receiving diode 240. The light receiving diode 240 would receive reflected energy corresponding to the energy emitted by the light transmitting diode 230, so that device 200 may perform one or more functions as described herein.

Figures 3, 4:
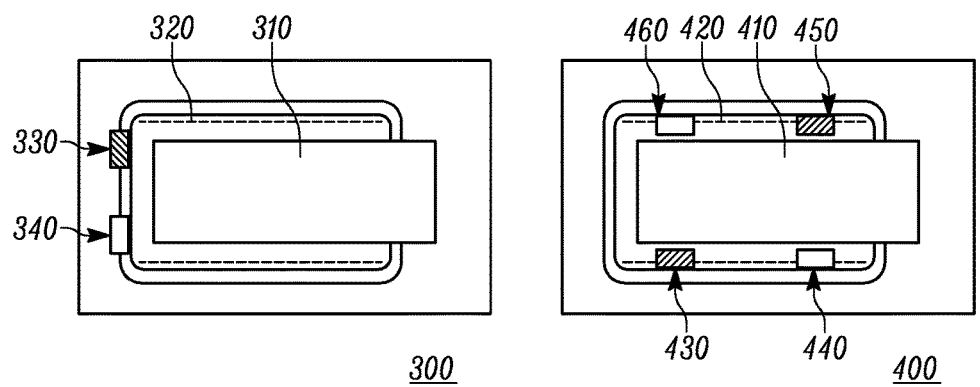
FIG. 3 illustrates another example biometric authentication sensor under a non-conductive surface with wake-on in accordance with one or more embodiments.
FIG. 4 illustrates yet another example biometric authentication sensor under a non-conductive surface with wake-on in accordance with one or more embodiments.

Referring to FIG. 3, there is shown another embodiment of the biometric authentication sensor 310 and the optional recessed region 320 associated with the sensor. This embodiment is similar to the embodiment represented by FIG. 2, except that the components of the activation sensor 330, 340 as positioned at a different location relative to the biometric authentication sensor 310. The activation sensor or sensors 330, 340 may be positioned anywhere as long as the sensor(s) is proximate the biometric authentication sensor 310.

Referring to FIG. 4, there is shown yet another embodiment of the biometric authentication sensor 410 and the optional recessed region 420 associated with the sensor. For this embodiment, a plurality of activation sensors 430, 440, 450, 460 are positioned about a periphery of the biometric authentication sensor, thus providing more detection opportunities for object detection and other functionality than the embodiments represented by FIGS. 2 and 3. For example, as shown in FIG. 4, a first light emitting diode 430 and a first light receiving diode 440 may be positioned at a first side of the biometric authentication sensor 410, and a second light emitting diode 450 and a second light receiving diode 460 may be positioned at a second or different side of the biometric authentication sensor 410. For some embodiments, the light emitting diodes and light receiving diodes may be positioned at opposite sides of the biometric authentication sensor 410. For other embodiments, the activation sensors may be positioned such that the light emitting diode of one sensor may be positioned opposite the light receiving diode of the other sensor, and vice-versa.

Figure 5:
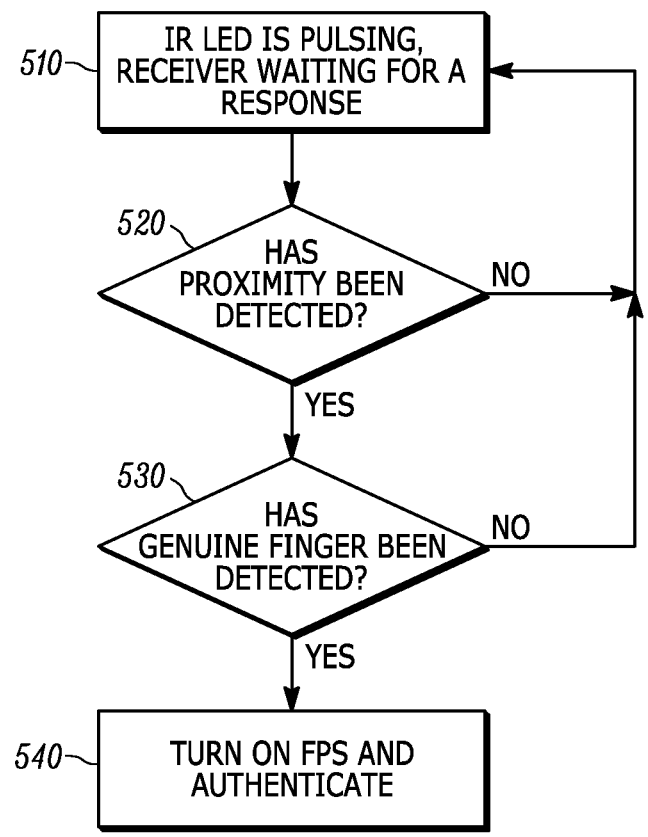
FIG. 5 illustrates an example operation of a biometric authentication sensor under a non-conductive surface with wake-on in accordance with one or more embodiments.

Referring to FIG. 5, there is shown an example operation 500 of a biometric authentication sensor and activation sensor under a non-conductive surface with wake-on in accordance with one or more embodiments. The activation sensor, such as an infrared LED system, may be used to either or both confirm proximity and live body. In particular, the activation sensor may activate the biometric authentication sensor and/or confirm liveness for authentication purposes.

One or more light signals may be transmitted from the activation sensor, as represented by step 510. For example, each of the activation sensors may include an infrared transmitting diode for sending one or more pulse signals and an infrared receiving diode to wait for a reflected response corresponding to the sent pulse signal. The activation sensor may detect at least one return signal associated with the at least one light signal at the activation sensor. The device may then determine whether an object or digit, such as a user finger or thumb, is within proximity of the biometric authentication sensor based on at least one return signal of the at least one return signal, as represented by step 520. If proximity has not been determined at step 520, then the operation 500 returns to transmitting and receiving signals at step 510.

If proximity is determined at step 520, then the operation 500 as performed by the activation sensor or other component of the device may determine whether the object or digit is a genuine biological organ at step 530. For one embodiment, the operation 500 comprises determination that the object or digit includes at least part of a circulatory system of a biological organism. For another embodiment, the operation 500 comprises identifying fluid flowing through the object. For yet another embodiment, the operation 500 comprises capturing multiple readings of the object to identify changes in the internal portion of the object. If a genuine object or digit is not detected at step 530, then the operation 500 returns to transmitting and receiving signals at step 510.

If a genuine object or digit is detected at step 530, then the operation 500 may continue with a process for authenticating the object or digit, at step 540. For example, the operation 500 as performed by the activation sensor or other component of the device may activate the biometric authentication device in response to determining that the object is detected.

Figure 6:
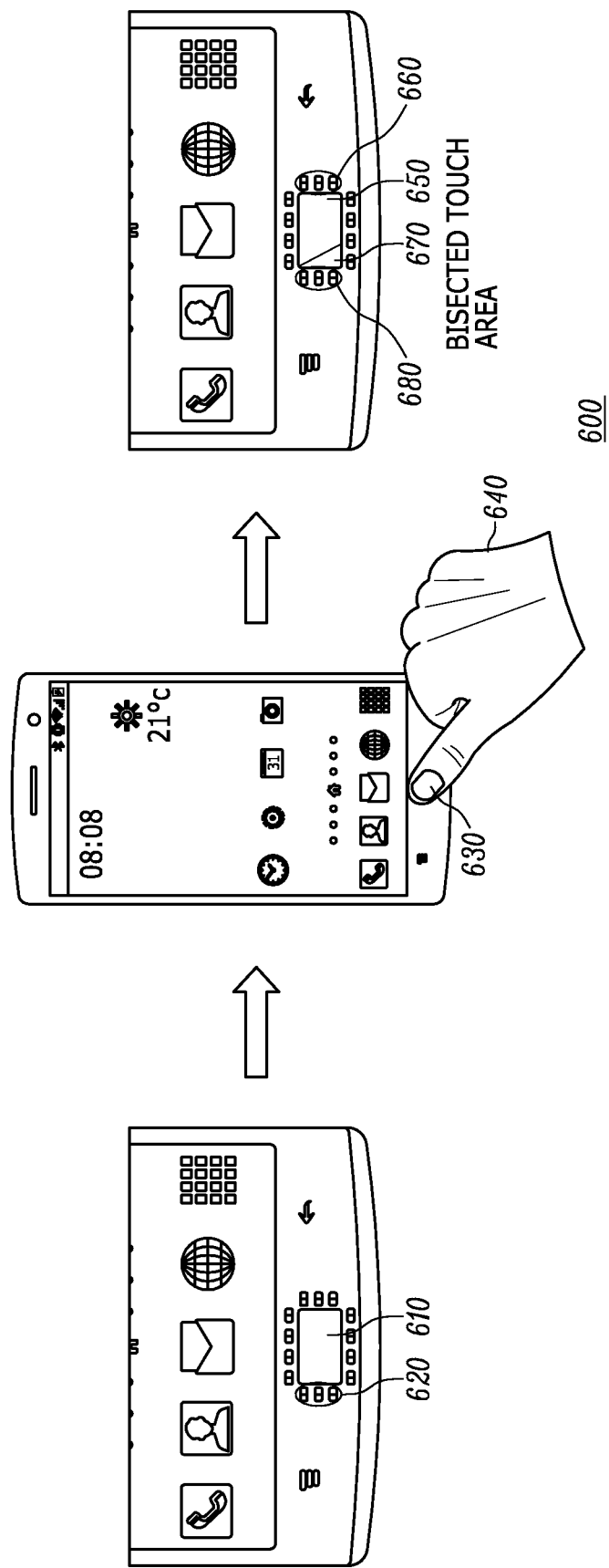
FIG. 6 illustrates an example storyboard of an operation of the electronic device in which embodiments of a biometric authentication sensor under a non-conductive surface with digit location evaluation may be implemented.

Referring to FIG. 6, there is shown an example storyboard of an operation of the electronic device, representing embodiments of a biometric authentication sensor under a non-conductive surface with digit location evaluation. The left shot of the storyboard illustrates the bottom portion of the electronic device having a biometric authentication sensor 610 and activations sensors 620 positioned about at least one side of the biometric authentication sensor. For example, as shown in FIG. 6, a plurality of activations sensors 620 may be positioned about a periphery of the biometric authentication sensor 610 under a non-conductive surface. For some embodiments, each activation sensor may include at least one proximity sensor. For other embodiments, each activation sensor may include at least one infrared sensor, in which each infrared sensor may include a light emitting diode and a light receiving diode.

As shown in FIG. 6, the middle shot of the storyboard illustrates an object or digit 630 of a user's body 640 that is detected in proximity of, or within a predetermined distance from, the biometric authentication sensor 610. For this middle shot, the object or digit 630 covers a portion, but not all, of the biometric authentication sensor 610 and corresponding activation sensors 620.

The right shot of the storyboard illustrates the bottom portion of the electronic device, having the biometric sensor 610 and the activation sensors 620 to assist the electronic device with determining the object coverage of the object or digit under the non-conductive surface sensor. The object coverage of the object or digit relative to the biometric authentication sensor may be determined by bisecting the first area 650 covered by the object, as detected by covered activation sensors 660, from a second area 670 not covered by the object, as detected by uncovered activation sensors 680.

The activation sensor or sensors 620 may be tuned to detect close range objects, as well as determine whether the object may be touching the non-conductive surface based on proximity "cross talk" below the surface of the non-conductive surface. For example, the activation sensor or sensors 620 may be tuned to detect close range objects of a few centimeters or less. For the activation sensor or sensors 620, the operation of the electronic device may ensure intimate user contact with the non-conductive surface in a contiguous series of sensors to ensure the contact is a genuine object or digit, rather than an in-pocket or in-bag false touch. The operation of the electronic device may also calculate the object coverage of the under non-conductive surface sensor by bisecting the area of the sensor from the two or more last covered sensors in a string of contiguously touched sensors. The operation of the electronic device may further watch for changes to the sensor coverage and prevent the biometric authentication sensor matching to initiate until a settling time period of minimal or no movement is detected.

Figure 7:
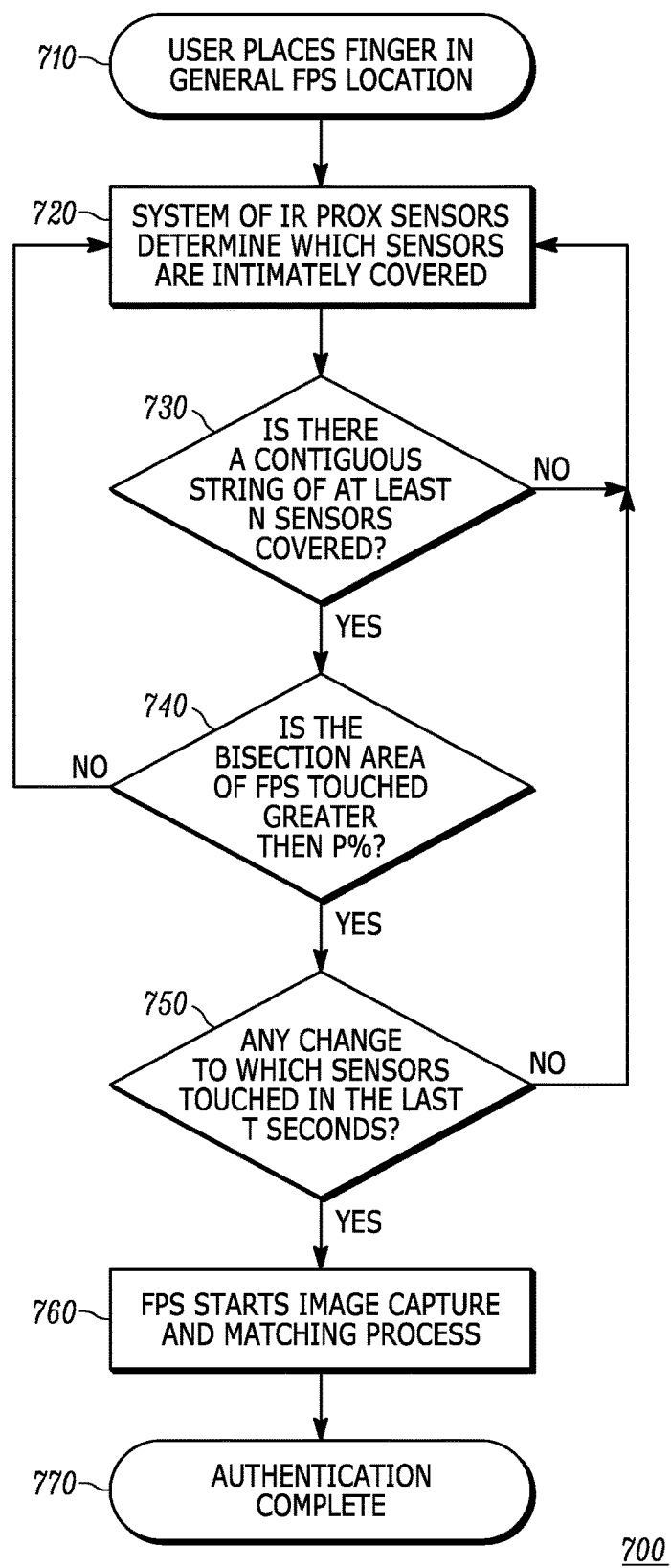
FIG. 7 illustrates an example operation of a biometric authentication sensor under a non-conductive surface with digit location evaluation in accordance with one or more embodiments.

Referring to FIG. 7, there is shown an example operation 700 of a biometric authentication sensor under a non-conductive surface with digit location evaluation. An object or digit is detected by the operation 700 proximal to the biometric authentication sensor at step 710. In particular, the activation sensor or sensors determine whether an object or digit is detected proximal to the biometric authentication sensor. The operation 700 of the electronic device then determines which activation sensor(s) are covered by the object and/or which activation sensor(s) are not covered by the object, at step 720. Next, the operation 700 of the electronic device determines whether a contiguous string of at least a threshold number of activation sensors are covered by the object, at step 730. If not, the operation 700 of the electronic device may return to step 720 to once again determine coverage of the activation sensor(s) by the object.

If the number of activation sensors covered by the object exceeds the threshold number of activation sensors, then the operation 700 of the electronic device determines whether a bisection area of the biometric authentication sensor covered by the object exceeds a threshold coverage value at step 740. If not, the operation of the electronic device may return to step 720 to once again determine coverage of the activation sensor(s) by the object.

If the bisection area of the biometric authentication sensor covered by the object exceeds a threshold coverage value, then the operation 700 of the electronic device may monitor the most recently covered activation sensors and determine whether a settling time period of minimal or no movement is detected, at step 750. If not, the operation 700 of the electronic device may return to step 720 to once again determine coverage of the activation sensor(s) by the object. If a settling time period of minimal or no movement is detected, then the biometric authentication sensor may initiate the process of capturing a biometric input sample and matching the biometric input sample with a corresponding biometric template, at step 760. If the process results in a match of the biometric input sample with a corresponding biometric template, then the authentication is complete, at step 770.

Figure 8:
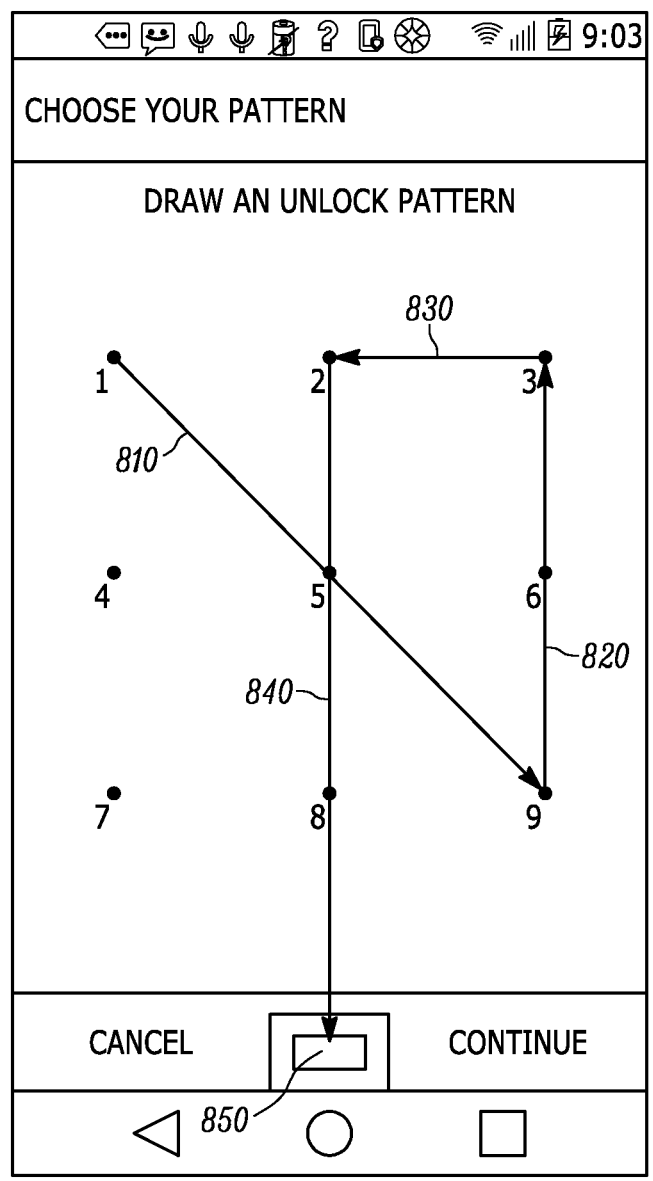
FIG. 8 illustrates an example display view of a biometric authentication sensor under a non-conductive surface with anti-spoofing in accordance with one or more embodiments.

Referring to FIG. 8, there is shown an example display view 800 of a biometric authentication sensor under a non-conductive surface with multi-factor authentication and anti-spoofing in accordance with one or more embodiments. An electronic device may allow a user to have a secure authentication to address certain concerns, such as improper lifting of the user's fingerprint or improper access to the user's device. In particular, the user may generate a pattern for a pattern unlock and, then, terminate the pattern at a biometric authentication sensor. For example, as shown in FIG. 8, a first part 810 of the pattern may be followed by a second part 820 of the pattern, followed by a third part 830, followed by a fourth part 840 of the pattern, and eventually terminating at the biometric authentication sensor 850. The electronic device may be protected from being spoofed by obtaining the biometric input sample from the biometric authentication sensor. The user may remain in touch contact with the non-conductive sensor, e.g., touchscreen, through the entire process. Additional residual biometric information, such as speed of pattern entry, may also be collected and provide additional confidence that the authentication process has authenticated the correct user.

The biometric authentication sensor may be positioned under the non-conductive surface as described above. It should be noted that, for other embodiments, the biometric authentication sensor may also be positioned at or above the non-conductive surface.

Figure 9:
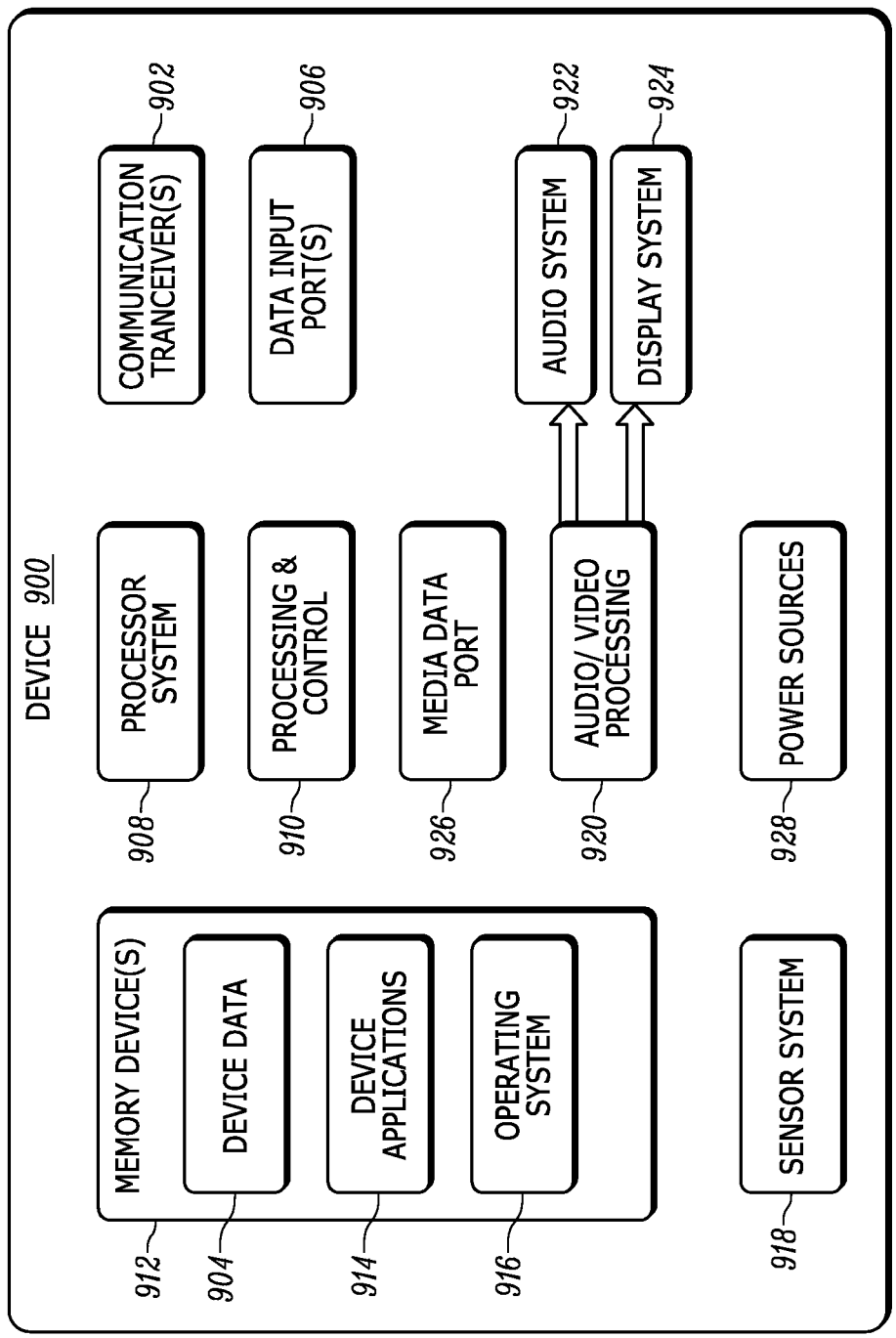
FIG. 9 illustrates various components of an example device that may implement embodiments of a biometric authentication sensor under a non-conductive surface.

Referring to FIG. 9, there are illustrated various components of an example device 900 in which embodiments of biometric authentication sensor under a non-conductive surface with wake-on may be implemented. The example device 900 may be implemented as any of the electronic devices described with reference to the previous figures, such as any type of client device, mobile phone, tablet, computing, communication, entertainment, gaming, media playback, and/or other type of device. For example, the electronic device 100 shown in FIG. 1 may be implemented as the example device 900.

The device 900 includes communication transceivers 902 that enable wired and/or wireless communication of device data 904 with other devices. Additionally, the device data may include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 900 may also include one or more data input ports 906 via which any type of data, media content, and/or inputs may be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which may include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device may be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus may include any one or combination of different bus structures and architectures, as well as control and data lines.

The device 900 also includes computer-readable storage memory 912 that enable data storage, such as data storage devices that may be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory may include various implementations of random access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 may be maintained as software instructions with a memory device and executed by the processing system 908. The device applications may also include a device manager, such as any form of a control application, software application, signal-processing and control module, code that is native to a particular device, a hardware abstraction layer for a particular device, and so on. In this example, the device 900 includes a sensor system 918 that implements embodiments of a biometric authentication sensor under a non-conductive surface with wake-on, and may be implemented with hardware components and/or in software, such as when the device 900 is implemented as the electronic device 100 described with reference to FIGS. 1-8. An example of the sensor system 918 is the biometric authentication sensor 102, the activation sensor or sensors 120, and the authentication application 114 that are implemented by the electronic device 100.

The device 900 also includes an audio and/or video processing system 920 that generates audio data for an audio system 922 and/or generates display data for a display system 924. The audio system and/or the display system may include any devices that process, display, and/or otherwise render audio, video, display, and/or image data. Display data and audio signals may be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 926. In implementations, the audio system and/or the display system are integrated components of the example device. Alternatively, the audio system and/or the display system are external, peripheral components to the example device.

The device 900 may also include one or more power sources 928, such as when the device is implemented as an electronic device. The power sources may include a charging and/or power system, and may be implemented as a flexible strip battery, a rechargeable battery, a charged super-capacitor, and/or any other type of active or passive power source.

Although embodiments of a biometric authentication sensor under a non-conductive surface with wake-on have been described in language specific to features and/or methods, the subject of the appended claims is not necessarily limited to the specific features or methods described. Rather, the specific features and methods are disclosed as example implementations of a biometric authentication sensor under a non-conductive surface with wake-on, and other equivalent features and methods are intended to be within the scope of the appended claims. Further, various different embodiments are described and it is to be appreciated that each described embodiment may be implemented independently or in connection with one or more other described embodiments.

The invention claimed is:

1. An electronic device comprising:
  a biometric authentication sensor;
  activation sensors adjacent to the biometric authentication sensor, the activation sensors configured to:
    detect proximity of an object at a predetermined distance from the biometric authentication sensor;
    determine whether a threshold number of the activation sensors are covered by the object; and
    activate the biometric authentication sensor in response to detecting the proximity of the object at the predetermined distance from the biometric authentication sensor and based in part on exceeding the threshold number of the activation sensors covered by the object.

2. The electronic device of claim 1, wherein the biometric authentication sensor is a sensor selected from a group consisting of a fingerprint sensor, a proximity sensor, and a touch sensor.

3. The electronic device of claim 1, wherein the activation sensors include at least one proximity sensor.

4. The electronic device of claim 1, wherein the activation sensors are positioned about a periphery of the biometric authentication sensor.

5. The electronic device of claim 1, wherein the activation sensors include at least one infrared sensor, each infrared sensor including a light emitting diode and a light receiving diode.

6. The electronic device of claim 1, wherein the predetermined distance corresponds to a thickness of a material layer that covers the biometric authentication sensor.

7. The electronic device of claim 1, wherein the activation sensors are configured to determine whether the object includes at least part of a circulatory system of a biological organism.

8. The electronic device of claim 1, wherein the activation sensors are configured to identify fluid flowing through the object.

9. The electronic device of claim 1, wherein the activation sensors are configured to capture multiple readings of the object to identify changes in an internal portion of the object.

10. The electronic device of claim 1, wherein the activation sensors are configured to:
  determine whether a bisection area of the biometric authentication sensor that is covered by the object exceeds a threshold coverage value based on the activation sensors that are covered by the object and the activation sensors that are not covered by the object;
  monitor the activation sensors that are covered by the object to determine whether a time period of no movement of the object is detected; and
  the activation of the biometric authentication sensor is further based on the threshold coverage value being exceeded and the time period.

11. A method of a biometric authentication system having a biometric authentication sensor and activation sensors, the method comprising:
  transmitting at least one light signal from one of the activation sensors;
  detecting at least one return signal associated with the at least one light signal at the one activation sensor;
  determining whether an object is within proximity of the biometric authentication sensor based on the at least one return signal;
  determining whether a threshold number of the activation sensors are covered by the object; and
  activating the biometric authentication sensor in response to determining that the object is detected and based in part on exceeding the threshold number of the activation sensors covered by the object.

12. The method of claim 11, wherein the biometric authentication sensor is a sensor selected from a group consisting of a fingerprint sensor, a proximity sensor, and a touch sensor.

13. The method of claim 11, wherein the activation sensors include at least one proximity sensor.

14. The method of claim 11, wherein the activation sensors are positioned about a periphery of the biometric authentication sensor.

15. The method of claim 11, wherein the activation sensors include at least one infrared sensor, each infrared sensor including a light emitting diode and a light receiving diode.

16. The method of claim 11, further comprising detecting the proximity of the object at a predetermined distance from the biometric authentication sensor, wherein the predetermined distance corresponds to a thickness of a material layer that covers the biometric authentication sensor.

17. The method of claim 11, further comprising determining whether the object is detected based on at least two return signals in response to determining that the object is within the proximity of the biometric authentication sensor.

18. The method of claim 11, further comprising determining whether the object includes at least part of a circulatory system of a biological organism.

19. The method of claim 11, further comprising identifying fluid flowing through the object.

20. The method of claim 11, further comprising capturing multiple readings of the object to identify changes in an internal portion of the object.

21. The method of claim 11, further comprising:
determining whether a bisection area of the biometric authentication sensor that is covered by the object exceeds a threshold coverage value based on the activation sensors that are covered by the object and the activation sensors that are not covered by the object;
monitoring the activation sensors that are covered by the object to determine whether a time period of no movement of the object is detected; and
said activating the biometric authentication sensor is further based on the threshold coverage value being exceeded and the time period.

* * * * *